Sept. 5, 1950   C. L. CARELOCK   2,521,565
SPREADER
Filed Jan. 3, 1946   3 Sheets-Sheet 1
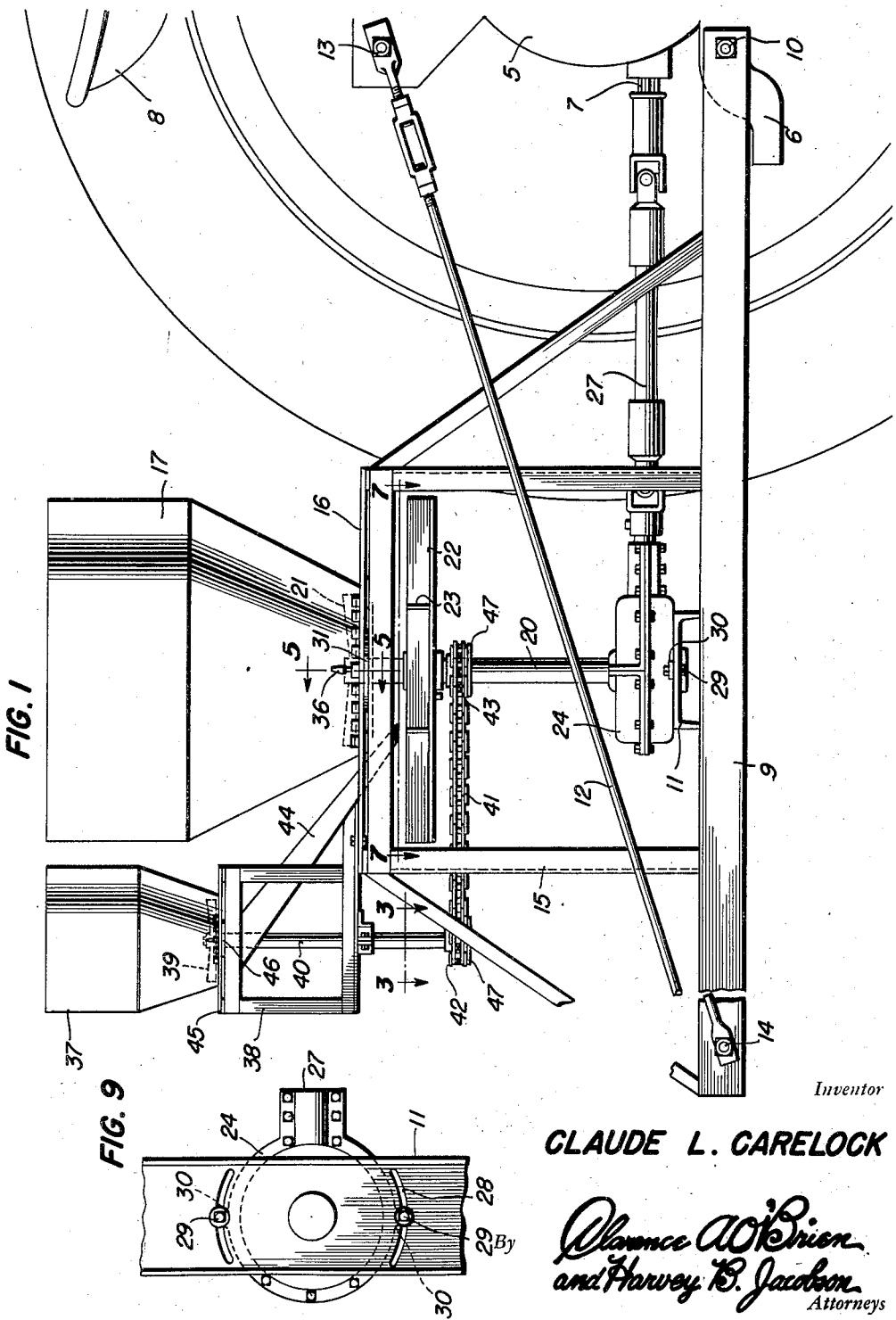
Inventor
CLAUDE L. CARELOCK

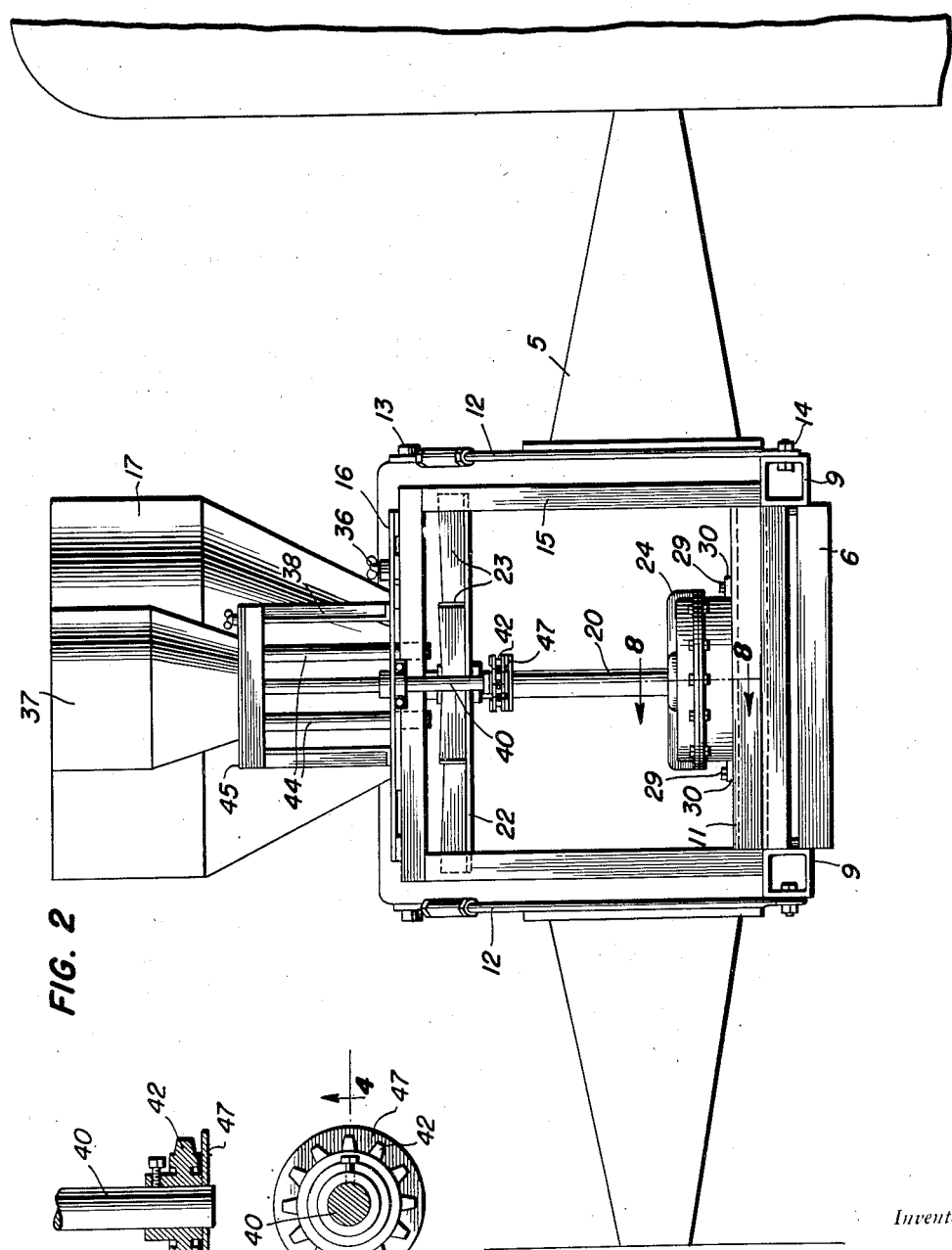

Sept. 5, 1950  C. L. CARELOCK  2,521,565
SPREADER
Filed Jan. 3, 1946 3 Sheets-Sheet 3
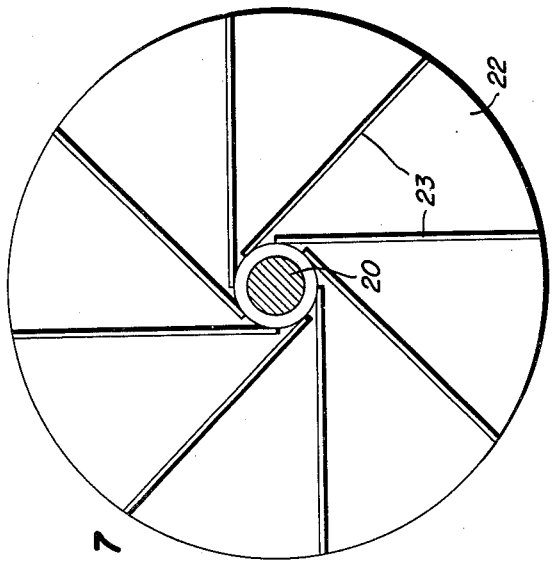
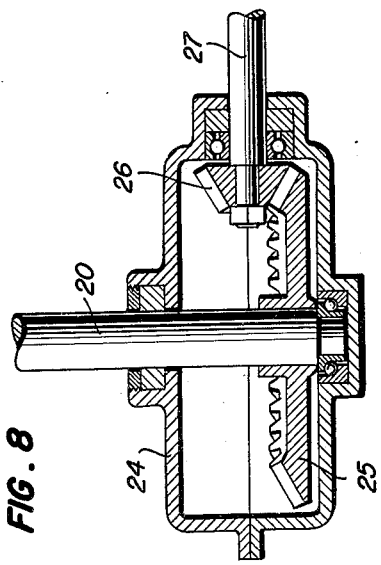
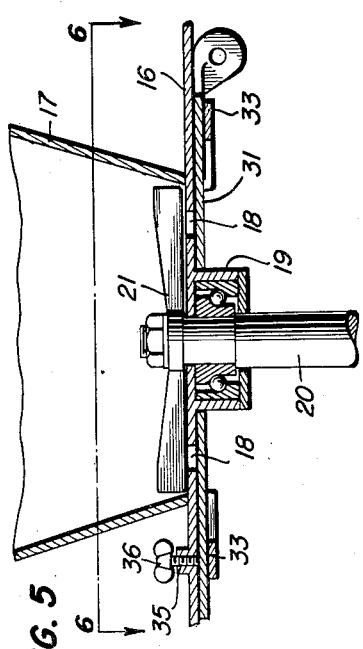
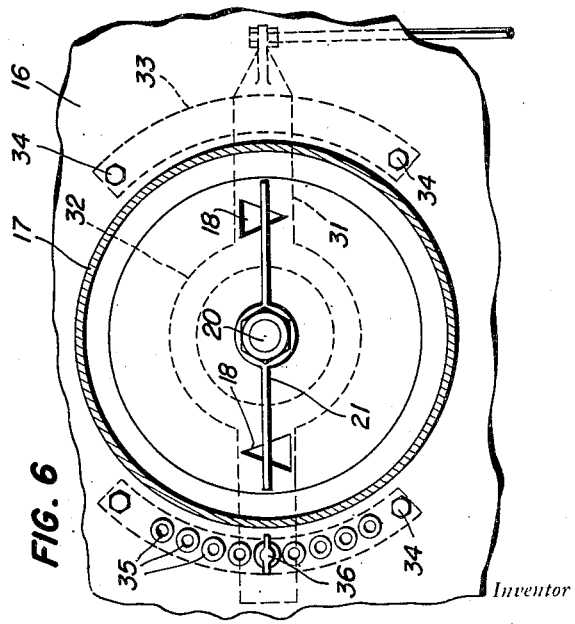
Inventor
CLAUDE L. CARELOCK
By Clarence A. O'Brien
and Harvey B. Jacobson
Attorneys Patented Sept. 5, 1950

2,521,565

UNITED STATES PATENT OFFICE 2,521,565

SPREADER

Claude L. Carelock, Douglas, Ga.

Application January 3, 1946, Serial No. 638,788

5 Claims. (Cl. 275—8)

This invention relates to spreaders, and has for its primary object the provision of a spreader attachment for tractors which, although incapable of use in connection with various materials, is especially adapted for spreading fertilizer and seeds.

A further object of the invention is to provide a spreader consisting of a hopper and suitable operating mechanism mounted on and at the rear of a tractor, said mechanism being operatively connected to the power take-off shaft of the tractor.

A more specific object of the invention is to provide a spreader attachment of the above kind which is comparatively simple, compact and durable in construction, and highly efficient in operation.

The exact nature of the present invention, as well as specific objects and features thereof, will become apparent from the following description when considered in connection with the accompanying drawings, in which:

Figure 1 is a fragmentary side elevational view showing a spreader embodying the present invention applied to the rear of a conventional tractor.

Figure 2 is a fragmentary rear elevational view of the construction shown in Figure 1.

Figure 3 is a horizontal section taken on line 3—3 of Figure 1, with the drive chain removed.

Figure 4 is a vertical section taken on line 4—4 of Figure 3.

Figure 5 is a fragmentary vertical transverse section through the bottom of the fertilizer hopper and adjacent parts.

Figure 6 is a horizontal section taken on line 6—6 of Figure 5.

Figure 7 is a horizontal section taken on line 7—7 of Figure 1.

Figure 8 is an enlarged fragmentary section taken on line 8—8 of Figure 2.

Figure 9 is a fragmentary inverted plan view showing the manner of mounting, for angular adjustment about its vertical axis, the housing for the gearing which connects the shaft of the spreader disc with the shafting coupled to the power take-off shaft of the tractor.

Referring in detail to the drawings, the present spreader attachment is shown applied to the rear of a conventional agricultural tractor which includes a rear axle housing 5, a trailer hitch 6, a rearwardly extending power take-off shaft 7, and a driver's seat 8. Rigidly mounted on and projecting rearwardly from the rear end of the tractor is an elevated horizontal support including spaced longitudinal bars 9 bolted at their forward ends as at 10 to opposite sides of the trailer hitch 6 and rigidly connected intermediate their ends by a transverse bar 11, the support being sustained in a horizontal position by means of rearwardly inclined braces or guy rods 12 bolted at their forward ends to the housing 5 as at 13 and at their rear ends to the rear ends of the longitudinal bars 9 as at 14.

Rigidly mounted on the bars 9 is an open frame 15 having a top wall in the form of a horizontal plate 16. Fixed directly upon the plate 16 is a main hopper 17, and, as shown in Figure 5, the plate 16 forms the bottom of this hopper and is provided with openings 18 forming material outlets for said hopper. The plate 16 is provided on its underside and centrally of the bottom of hopper 17 with a bearing 19 in which is journaled the upper end portion of a vertical shaft 20. A stirrer 21 is secured on the upper end of shaft 20 directly above the plate 16 and within the bottom of the hopper 17. This stirrer is adapted to be rotated within the bottom of the hopper by driving shaft 20, so as to agitate and loosen the material within the bottom of the hopper and insure easy discharge of said material from the hopper through the outlet openings 18. A disc 22 is secured on the shaft 20 a short distance below the plate 16, and this disc is provided on its upper surface with a plurality of tangentially extending vanes 23. The vanes are arranged so that when the material passes from the hopper through the openings 18, it will be radially discharged from the disc 22 and scattered in all directions, so that as the tractor moves ahead, an equal distribution of the material being spread will be made over a certain radius on the field or the like. The cross-bar 11 is disposed at the bottom of frame 15 intermediate the front and rear of the latter, and mounted on this bar is the casing or housing 24 of a bevelled gearing including a large bevelled gear 25 secured on the lower end of shaft 20 and a bevelled pinion 26 secured on one end of a flexible shafting 27 coupled to the power take-off shaft 7 of the tractor. It will thus be seen that when the power take-off shaft 7 is driven, motion is transmitted to shaft 20 so as to rotate stirrer 21 and scattering disc 22.

While the attachment is shown applied to a tractor having a rearwardly extending power take-off shaft, it may be used in connection with a tractor having a side or laterally extending power take-off shaft. In order to permit this, the casing or housing 24 is mounted on the bar 11 for angular adjustment about its vertical axis as illustrated in Figure 9. For this purpose the bar 11 is provided with a pair of spaced arcuate slots 28 receiving bolts 29 that extend through ears 30 projecting from opposite sides of the casing 24. The slots 28 are concentric with the shaft 20 or the vertical axis of casing 24, and it will be seen that by loosening bolts 29, the desired adjustment of casing 24 may be made. By tightening bolts 29, the casing 24 may be secured in adjusted position.

It is desired to adjust or control the amount of material passing from the hopper 17 through the openings 18. For this purpose, a valve bar 31 is disposed against the underside of plate 16 and has a circular intermediate portion 32 journaled on the bearing 19 as shown in Figures 5 and 6. The openings 18 are provided at opposite sides of shaft 20, and the valve bar 31 is adapted to be oscillated for simultaneously and similarly opening or closing the openings 18. In order to rotatably support the valve bar 31 in position against the underside of plate 16, the ends of said valve bar may be disposed to extend across arcuate strips 33 which are disposed at opposite sides of shaft 20 concentric with the latter, said strips 33 having their ends secured at 34 to the underside of plate 16 and having their remaining portions spaced from plate 16. Obviously, valve bar 31 may be suitably lever actuated from adjacent the driver's seat 8 of the tractor. One of the strips 33 may be graduated for use as a gauge in regulating the amount of seed or fertilizer to be spread. To secure the valve bar 31 in any desired adjusted position, the plate 16 may be provided with an arcuate series of threaded openings 35 coincident with this particular strip 33 for selective reception of a set screw 36 adapted to be tightened into engagement with the adjacent end of the valve bar 31 to secure it in adjusted position.

In case the device is used for simultaneously spreading two different materials, a second hopper 37 may be provided for feeding material to the disc 22, in addition to the material fed to the latter from the hopper 17. For instance, the hopper 17 may be utilized to cointain fertilizer to be spread, and the hopper 37 may be utilized to contain seed to be simultaneously spread. As shown, the auxiliary and smaller hopper 37 is mounted on a supplemental frame 38 smaller than but similar to the frame 15, said frame 38 being mounted on the top of the frame 15 to project rearwardly from the latter behind the hopper 17. The same arrangement may be provided for controlling the discharge of material from hopper 37 as is provided for hopper 17, and a stirrer 39, similar to the stirrer 21 may be provided within the bottom of hopper 37 and secured upon the upper end of a vertical shaft 40 corresponding to the shaft 20. The lower end of shaft 40 is operatively connected with the shaft 20 at a point beneath the disc 22 by means of a sprocket gearing including a sprocket chain 41 passing around sprocket wheels 42 and 43 respectively secured on the shafts 40 and 20. However, instead of providing the shaft 40 with a scattering disc beneath the top of the frame 38, the material discharged from hopper 37 is conducted to the scattering disc 22 by means of forwardly inclined chutes or spouts 44. In this way, both materials are fed to the disc 22 to be scattered or spread thereby. The plate at the top of frame 38 which forms the bottom of hopper 37 is indicated at 45, and the valve bar which controls the discharge of material from hopper 37 and which corresponds to the valve bar 31 of hopper 17, is indicated at 46.

In order to prevent the chain 41 from dropping off of the sprockets 42 and 43, each of the latter has a disc 47 attached to the underside thereof and mounted upon the shaft which carries said sprocket wheel, the disc 47 being of slightly greater diameter than the sprocket wheel as shown in Figures 3 and 4 so that the chain will rest on the disc in passing about the sprocket.

In use, the materials to be spread are dumped into the hoppers 17 and 37, and the power take-off shaft 7 is placed in operation so as to drive the shafts 20 and 40. The stirrers 21 and 39 are thus rotated to keep the materials from clogging the outlets of the hoppers. As the material passes from hopper 17, it is caught by the disc 22, and as the material passes out of the outlets of hopper 37, it is conveyed to the disc 22 by the spouts 44. Due to rotation of disc 22, the materials are thrown outwardly and spread evenly over the surface traversed by the tractor. While the machine is in operation, the valve bars 31 and 46 may be properly adjusted so as to secure the most desirable rate of flow of materials from the hoppers. Of course, if desired, only one and either one of the hoppers may be used alone by merely dumping material only into the particular hopper used.

From the foregoing description, it is believed that the construction, operation and advantages of the present invention will be readily understood and appreciated by those skilled in the art. It is to be understood that the invention is capable of modification and changes in details of construction, such as fall within the scope of the invention as claimed.

What I claim is:

1. In a spreader, in combination with a tractor including a rear axle housing and having a trailer hitch and a projecting power take-off shaft, a horizontal elevated support rigidly attached to and projecting rearwardly from the trailer hitch, a frame mounted on said support, a hopper mounted on the top of said frame and having a bottom discharge opening, a vertical shaft disposed within the frame and extending upwardly into the hopper, a stirrer on the upper end of the vertical shaft within the hopper, a material spreading disc carried by the shaft directly beneath the hopper in position to receive the material discharged through the discharge opening, a flexible shaft coupled to the power take-off shaft, said support including a transverse bar, a gear casing mounted on said transverse bar, a bevelled gearing within said gear casing operatively connecting the lower end of the vertical shaft with the rear end of said flexible shaft, and rearwardly inclined guy rods secured at their forward ends to opposite sides of the rear axle housing and at their rear ends to opposite sides of said support at the rear end of the latter.

2. The construction defined in claim 1, wherein said gear casing is angularly adjustable about the axis of said vertical shaft, in combination with means for securing said gear casing in any of its angularly adjusted positions.

3. In a spreader, in combination with a tractor having a trailer hitch and a power take-off shaft above said hitch, a horizontal elevated support rigidly attached to and projecting rearwardly from the trailer hitch, a frame mounted on said support, a hopper mounted on the top of said frame and having a discharge opening, a vertical shaft disposed within the frame and extending upwardly into the hopper, a stirrer on the upper end of said vertical shaft within the hopper, a material spreading disc carried by the shaft directly beneath the hopper in position to receive the material discharged through the discharge opening, a flexible shaft coupled to the power take-off shaft, a gear casing mounted on the support, and a bevelled gearing within said gear casing operatively connecting the lower end of said vertical shaft with said flexible shaft, a supplemental frame mounted on the top of said first named frame at the rear of the latter, a second smaller hopper mounted on said supplemental frame rearwardly of and higher than the first-named hopper and having a discharge opening, a forwardly inclined spout for delivering material discharged through the discharge opening of the second hopper onto said disc, a second vertical shaft journaled in the supplemental frame and extending into the second hopper, a stirrer on the upper end of said second vertical shaft within said second hopper, and means operatively connecting the first named vertical shaft to the lower end of said second named vertical shaft.

4. In a spreader, in combination with a tractor having a trailer hitch and a power take-off shaft, a horizontal elevated support attached to and projecting rearwardly from the trailer hitch, a frame mounted on said support, a hopper mounted on said frame and having a discharge opening, a vertical shaft disposed within the frame and extending upwardly into the hopper, a stirrer on the vertical shaft within the hopper, a material spreading disc carried by the shaft beneath the hopper in position to receive the material discharged through the discharge opening, a flexible shaft coupled to the power take-off shaft, a gear casing mounted on the support, and a bevelled gearing within said gear casing operatively connecting the vertical shaft with said flexible shaft, a supplemental frame mounted on the first named frame at the rear of the latter, a second smaller hopper mounted on said supplemental frame and having a discharge opening, a spout for delivering material discharged through the discharge opening of the second hopper onto said disc, a second vertical shaft journaled in the supplemental frame and extending into the second hopper, a stirrer on said second vertical shaft within said second hopper, and means operatively connecting the first named vertical shaft to the second named vertical shaft including sprockets carried by said vertical shafts, a sprocket chain passing around said sprockets, and discs secured to the undersides of said sprockets and marginally supporting said sprocket chain as it passes around said sprockets.

5. The construction defined in claim 1, in combination with a valve bar pivoted beneath the top of said frame for swinging horizontally about said vertical shaft to control the flow of material through the discharge opening of said hopper, and means to adjust said valve bar.

CLAUDE L. CARELOCK.

REFERENCES CITED

The following references are of record in the file of this patent:

UNITED STATES PATENTS

| Number | Name | Date |
|---|---|---|
| 1,655,780 | Brinninger et al. | Jan. 10, 1928 |
| 1,970,652 | Hammitt | Aug. 21, 1934 |
| 2,079,061 | Zuckerman | May 4, 1937 |
| 2,162,689 | Mayfield | June 20, 1939 |
| 2,185,415 | Miles | Jan. 2, 1940 |
| 2,192,802 | Pound | Mar. 5, 1940 |
| 2,293,977 | Hoffstetter | Aug. 25, 1942 |
| 2,334,376 | Bauer | Nov. 16, 1943 |
| 2,348,692 | Jensen | May 9, 1944 |
| 2,363,749 | Rude | Nov. 28, 1944 |